United States Patent [19]

Simon

[11] 4,354,651

[45] Oct. 19, 1982

[54] CABLE GROMMET WITH TENSION RELIEF

[76] Inventor: Hans Simon, Bruchhausener Strasse, 5463 Unkel, Fed. Rep. of Germany

[21] Appl. No.: 954,827

[22] Filed: Oct. 26, 1978

[30] Foreign Application Priority Data

May 24, 1978 [DE] Fed. Rep. of Germany ....... 2822643

[51] Int. Cl.³ .............................................. F16L 5/00
[52] U.S. Cl. .................................. 248/56; 174/153 G
[58] Field of Search ......... 248/56; 174/152 G, 153 G; 339/103 B, 103 R; 285/81, 162, 322

[56] References Cited

U.S. PATENT DOCUMENTS

| 682,215 | 9/1901 | Mauer et al. | 285/215 |
| 710,488 | 10/1902 | Mauer et al. | 285/215 |
| 1,101,963 | 6/1914 | Rosenfeld | 285/322 |
| 1,224,269 | 5/1917 | Broadbent | 285/322 |
| 3,056,852 | 10/1962 | Sachs | 339/103 B X |
| 3,285,551 | 11/1966 | Tschanz | 248/56 |
| 3,366,727 | 1/1968 | Rueger | 174/153 G X |
| 3,514,129 | 5/1970 | Holdren | 285/162 |
| 3,843,833 | 10/1974 | Nicholson | 174/153 G |
| 3,865,461 | 2/1975 | Ludwig | 339/103 R |
| 4,108,507 | 8/1978 | Renner et al. | 174/153 G |

FOREIGN PATENT DOCUMENTS 2042908 3/1972 Fed. Rep. of Germany ... 174/153 G

Primary Examiner—Roy D. Frazier
Attorney, Agent, or Firm—John S. Roberts, Jr.

[57] ABSTRACT

A grommet for relieving tension or strain when securing a cable in an aperture comprising two generally circular in cross section, tubular rotatably and coaxially disposed telescoping clamping members with the inner cross section of the outer member deviating from the circular cross section and with the inner member being slotted at one of its ends, in an axial direction over part of its length to form clamping jaws having rising or tapering projections thereon disposed within said outer member and which cause the clamping jaws to engage and lock the cable when the members are rotated relative to each other.

16 Claims, 23 Drawing Figures

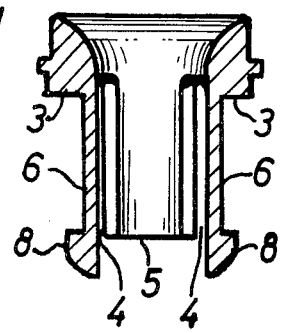
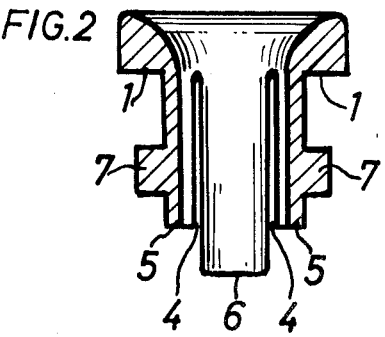
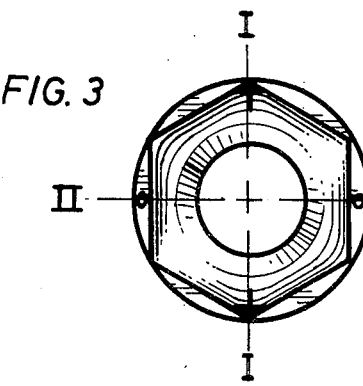
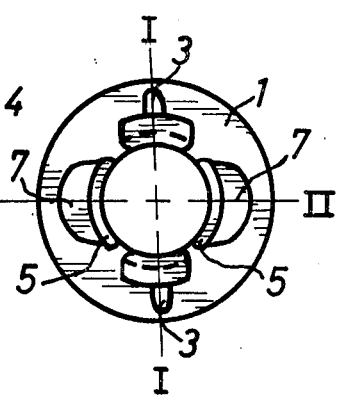
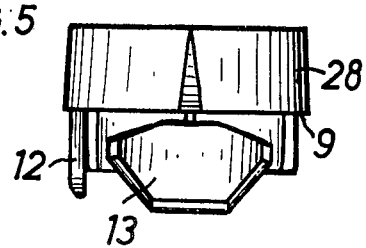
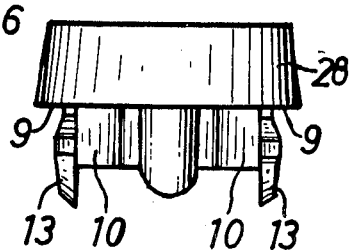
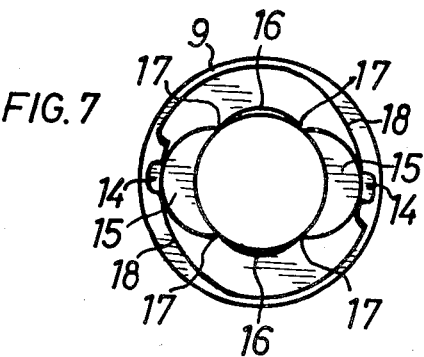
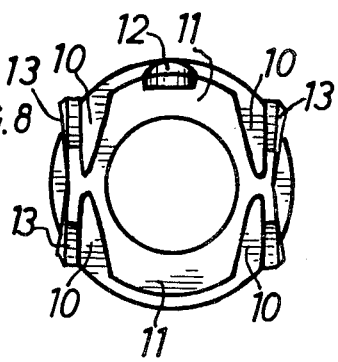

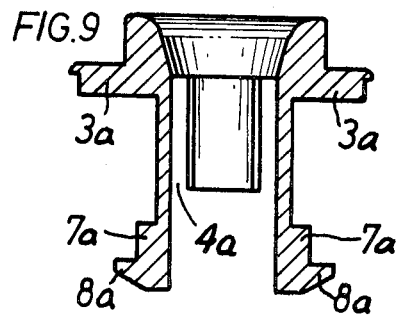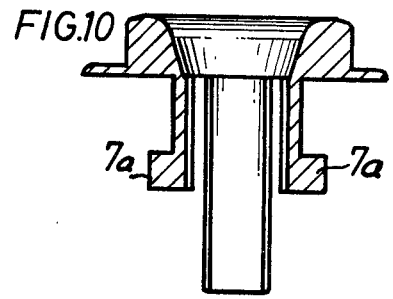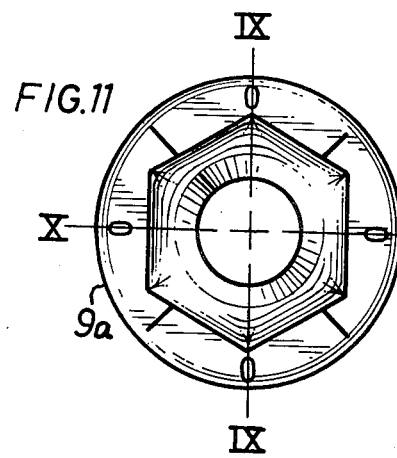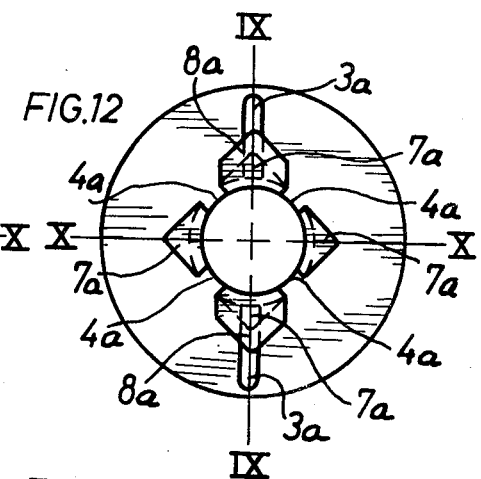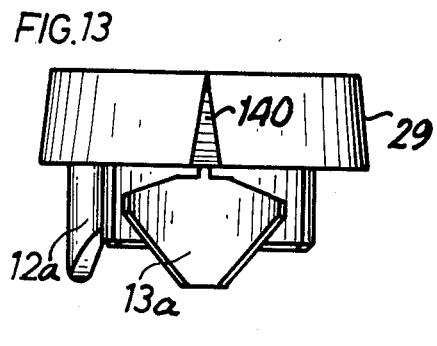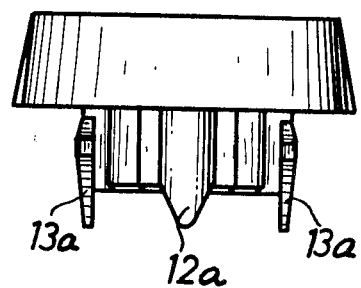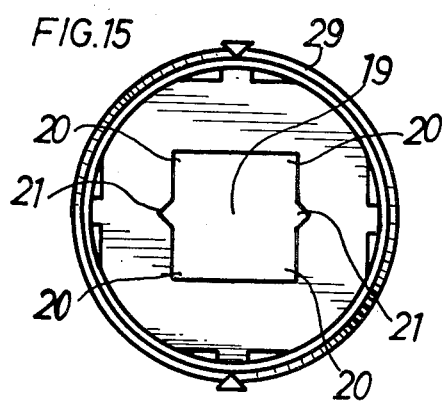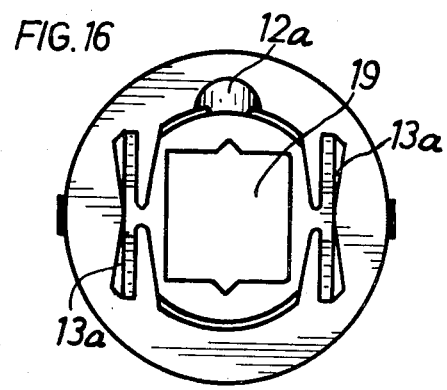

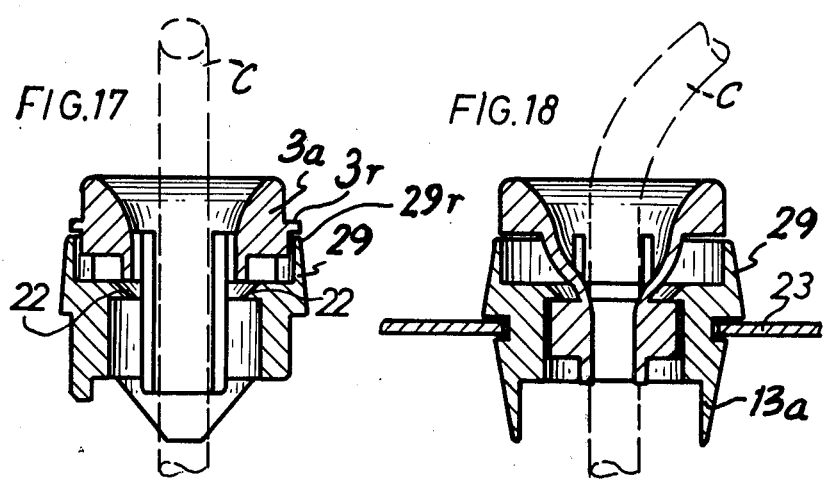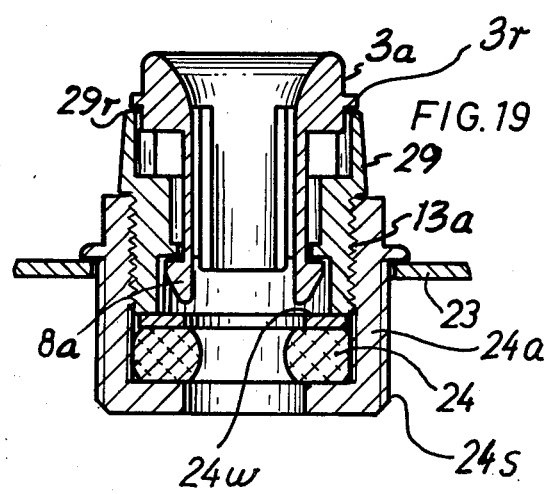

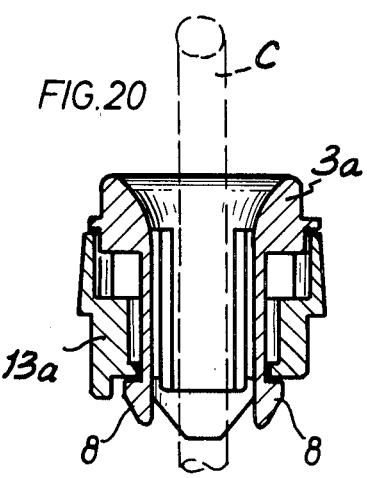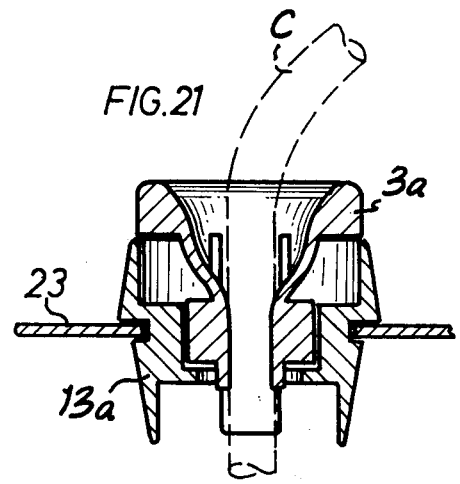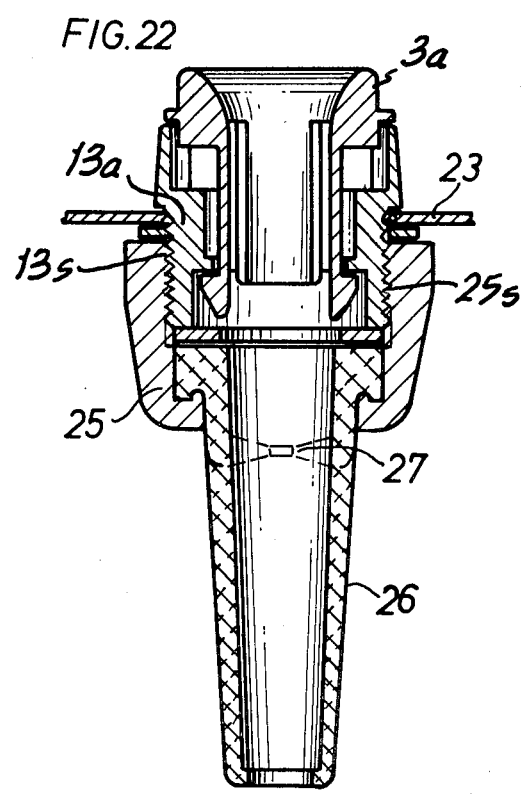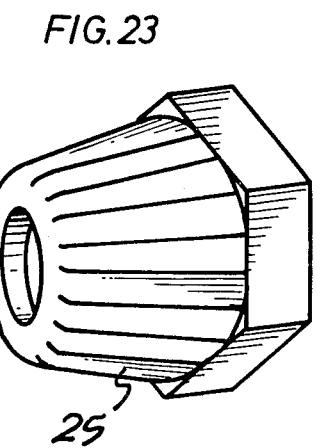

4,354,651

CABLE GROMMET WITH TENSION RELIEF

BACKGROUND OF THE INVENTION

The invention relates to a cable grommet with tension relief means for securing a cable in an opening and constitutes an improvement of the invention described in applicant's co-pending application, Ser. No. 850,196 filed Nov. 10, 1977, now U.S. Pat. No. 4,169,572.

OBJECT OF THE INVENTION

It is an object of the present invention to make the cable grommet with tension relief means as described in U.S. Pat. No. 4,169,572 compact, thereby improving the utilization, and the applicability thereof while reducing the material cost.

SUMMARY OF THE INVENTION

The compactness of the new cable grommet is obtained by providing the outer member of the grommet with a square or triangular shaped inner opening. In the embodiment dealing with the inner square opening, the inner member is divided into four clamping jaws having outwardly extending projections or clamping lobes while in the other embodiment, the inner member is subdivided into three clamping jaws having clamping lobes arranged thereon.

The projections are preferably of equilateral triangular shape in cross section and are normally disposed at the same level relative to each other in axial direction. However, in accordance with a further embodiment of the present invention, the clamping lobes are located at different levels with one diametrically opposed pair being disposed at the extreme end of their respective jaws, while the other diametrically opposed pair is disposed at a level thereabove on their respective jaws. This arrangement permits the clamping forces to be distributed along the length of the cable deforming it through a maximum clamping area while preventing the destruction of the grommet by warping the clamping jaws or the destruction of the cable by localizing the forces.

In another embodiment, the diametrically opposed pairs of clamping lobes are disposed at different levels in axial direction, i.e. they are staggered relative to each other. In this way, a labyrinth-like securement of the cable is obtained which is particularly resistant to traction. Additionally, the walls of the inner opening of the outer member may be conical in axial direction so that traction forces in the cable assist in increasing the clamping force. This is particularly the case if the cable is clamped at two or more different locations in axial direction.

In a further embodiment, the projections are disposed on the jaws to directly engage and contact the cable.

These projections may be advantageously arranged at various axial levels relative to each other so that rotation of the inner member relative to the outer member will engage the cable in a labyrinth manner thus enabling a safe fixation of the cable without clamping it at certain points.

In accordance with another embodiment, the inner opening of the outer member may additionally include, in the wall portions facing each other, clearances having at least one recess therein for receiving the projections.

By the provision of one or more recesses, the projections on the clamping jaws will operate as click-stop lobes and will permit the inner member to be selectively rotated to determine the degree to which the cable has been secured.

These recesses are suitably relatively flat and progressively staggered as to depth in order to readily determine the inner member's location relative to the outer member while maintaining the clamping of the cable, with the use of excessive force.

In accordance with another embodiment, the inner non-circular opening of the outer member extends only over a portion of its axial length while the remaining portion thereof is substantially circular in cross section.

In this arrangement, the projections provided on the clamping jaws snap into the recess and are guided there within at the same time to prevent axial shifting of the members relative to one another.

In these embodiments, it has been found that by making the outer member non-circular the forces generated by the reciprocal turning of the inner member therewithin when clamping the cable are absorbed by the outer member. Additionally, it has been found that by limiting the depth of the non-circular portion to that of the opening of the housing, the outer member becomes the most-loaded, absorbing the forces generated and transmitting them through the wall of the opening thereby avoiding failure of the members.

A further embodiment includes stop means arresting the reciprocal position of the inner member relative to the outer member by providing means on the underside of a circumferential rim provided on the inner member which engage a front rim, or collar, of the outer member. The stop means may be provided on the complete circumference of the inner member or of the outer member, respectively, in order to assure a graded adjustment of the clamping force as the cable is secured within the grommet. Alternatively or additionally, the stop means are shaped to arrest the reciprocal position of the inner member with respect to the outer member when the clamping jaws exert the maximum clamping pressure upon the cable.

In a further embodiment, the stop means can be formed by bridge-like ribs provided on the underside of the circumferential rim of the inner member, and grooves, with or without chamfers, on the circumferential rim of the outer member. In most instances, two bridge-like radially forcing ribs and two radially facing grooves will suffice, but in either case, the bridge-like ribs enter into the grooves when the clamping jaws exert the maximum clamping pressure upon the cable. Alternatively, and with the same result, grooves can be placed on the inner member and ribs on the outer member.

In a further embodiment, the outer member is provided with threads on its outside surface to receive a cap having mating threads. The cap enhances the grommet's resistance against bending and makes the same water-tight when disposed in the opening.

In a further embodiment, the outer member is provided over a portion of its length with two opposing recesses arranged in paraxial direction within which a pair of blocking wings is disposed with the wing ends extending beyond the outer periphery of the outer member. In use, the flexible blocking wings are flexed inwardly permitting the grommet to be easily inserted in the aperture, whereafter the wings resume their original position locking the grommet in place. Also, chamfering of the wings simplifies insertion of the grommet into the openings. A twist protection cam is provided on the outer member engaging a recess in the passage opening preventing co-twisting of the outer member when the inner member is rotated to arrest the cable relative to the outer member.

To this end, the inner member is provided with a hexagon or suitable head engagable by a wrench for turning the same.

In a further embodiment, which is particularly suited for smaller devices made of plastic, the outer member is integrally formed with the housing wherein the opening is located. This reduces the necessary work as the inner member only need be threadably inserted within the outer member and locked in place.

It is apparent that the outer member may be made integral with the housing notwithstanding the material from which the housing is made, as the outer portion need not necessarily be made of plastic material. Such might be the case when the housings have been made from metal in a casting or a die casting process. It is preferred, however, that the inner member be made of plastic material for insulation purposes.

BRIEF DESCRIPTION OF THE DRAWINGS

The invention will be more readily understood from the following description of exemplified embodiments with reference to the accompanying drawings in which FIG. 1 is a cross section taken on line I—I of FIGS. 3 and 4 of the inner member of a cable grommet to be used in an outer member having an oval shaped clearance in cross section, FIG. 2 is a section taken on lines II—II of FIGS. 3 and 4 of the inner member of FIG. 1, FIG. 3 is a top view of the inner member of FIG. 1, FIG. 4 is a bottom view of the inner member of FIG. 1, FIG. 5 is a side view of the outer member, FIG. 6 is a side view of the outer member of FIG. 5 rotated 90°, FIG. 7 is a top view of the outer member of FIG. 5, FIG. 8 is a bottom view of the outer member of FIG. 5.

FIG. 9 is a cross section taken on line IX—IX of FIGS. 11 and 12 of another embodiment of an inner member to be used in an outer member having a square recess, FIG. 10 is a cross section taken on lines X—X of FIGS. 11 and 12 of the inner member of FIG. 9, FIG. 11 is a top view of the inner member of FIG. 9, FIG. 12 is a bottom view of the inner member of FIG. 9, FIG. 13 is a side view of the outer member adapted to receive the FIG. 9 inner member, FIG. 14 is a side view of the FIG. 13 outer member rotated 90°, FIG. 15 is a top view of the FIG. 13 outer member showing a square recess with the holding lugs removed, FIG. 16 is a bottom view of FIG. 14 showing a square recess, FIG. 17 is a cross section of an assembled cable grommet having an oval recess, FIG. 18 is a cross section of the FIG. 17 grommet rotated by 90°, FIG. 19 is a cross section of another embodiment showing a threaded cable grommet in an open state, FIG. 20 is another cross section of an assembled cable grommet with a cable, FIG. 21 is a cross section of FIG. 20 rotated 90°, FIG. 22 is a cross section of another threaded cable grommet, and FIG. 23 is a perspective view of the screw cap employed in FIG. 22.

DESCRIPTION OF THE INVENTION

Figure 8A:
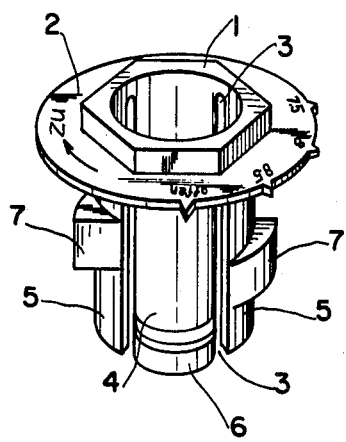
FIG. 8a is a perspective view showing the external structure of the inner portion of the cable grommet shown in FIGS. 1-4 and 9-12, respectively.

The inner member of the cable grommet, as seen in FIGS. 1-4 inclusive, comprises a cylindrical hollow body designated generally as 1 including a circumferential rim 1 of hexagonal shape 2 (FIG. 3) to accommodate a wrench, having a pair of radially opposed bridge-like holding ribs 3 provided on its under surface with the lower end of the cylindrical hollow body 1 being subdivided by axial slots 4 forming two quarter cups 5 and 6, opposing one another. Each quarter cup 5 is shaped as a clamping jaw having a projection 7 serving as a clamping lobe extending outwardly and above the free end thereof. The quarter cups 6 each include at the free ends thereof outwardly extending holding lugs 8 which, when assembled with the outer member extend below the lower edge thereof.

The outer member of the grommet designated by the numeral 28 is shown in FIGS. 5-8 inclusive and is provided below its circumferential collar 9 with a pair of opposed blocking wings 13. A pair of substantially diametrically opposed twist protection cams 12 only one being shown are disposed between the wings 13.

In FIG. 6 the outer member 28 is rotated 90° showing the blocking wings 13 defining axial recesses 10 permitting the ends of blocking wings 13 to move inwardly.

As seen in FIG. 7, circumferential collar 9 includes a pair of axial grooves 14 within which holding ribs 3 of the inner element 1 engage when the latter is inserted and rotated into the outer element 28. Chamferings 18 are provided forwardly of each of the grooves 14 and above oval recesses 15. Recesses 15 receives clamping lobes 7 of the inner member when the same is rotated to effect the clamping of the cable. Clamping lobes 7 are further guided over projections 17 in the dent impressions 16 of the outer member and are stopped thereat.

Such stopping may also be attained by grooves 14 of the outer member in lieu of holding cams 3 thus saving the costs for circumferential collar 9 and reducing the overall height.

Figure 8B:
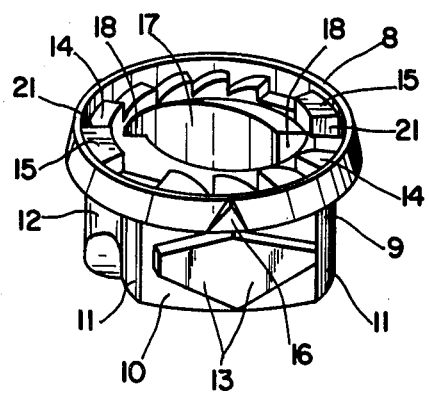
FIG. 8b is a perspective view showing the external structure of the outer portion of the cable grommet shown in FIGS. 5-8 and FIGS. 13-16, respectively.
Figure 8C:
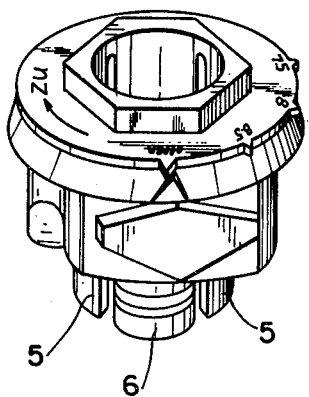
FIG. 8c is a perspective view showing the assembled grommet of FIGS. 5-8 and FIGS. 9-16, respectively.

FIG. 8 is a bottom view of the outer member and includes a plurality of recesses 10 positioned adjacent blocking wings 13 having the outer ends projecting beyond the outer radius of tubular body 11. When operating the clamp, twist projection cam 12 prevents twisting of the outer member within the clearance of the passage opening of the apparatus wall within which it is inserted.

The above described grommet is generally the subject of U.S. Pat. No. 4,169,572 as seen at FIGS. 4-11 thereof and the same is incorporated herein as background material.

FIGS. 9–16 inclusive show a grommet with FIGS. 9–12 corresponding to the inner member of FIGS. 1–4 and FIGS. 13–16 corresponding to the outer member of FIGS. 1–8.

FIG. 9 shows the cross sectional view of the inner member of the embodiment with like parts designated by the same numeral with subscripts as used in conjunction with FIGS. 1–4, and which is to be used in an outer member which shows, instead of an oval clearance, a clearance which is square in cross section. The advantage of this embodiment may be seen in that all of the four quarter cups of the inner portion have clamping lobes 7a. These clamping lobes 7a are provided at the ends of the quarter cups as shown in FIG. 9, with only one pair being shown depicting the lobes 7a with this pair of opposing quarter cups further including holding lugs 8a which extend beyond the outer member when assembled. This pair of quarter cups including clamping lobes 7a and holding lugs 8a are longer in axial direction, than the other pair of quarter cups which do not include holding lugs, all as shown in FIG. 10.

FIG. 9A is similar to that of FIG. 9, differing in that the clamping lobes 7a, 8a are disposed inwardly to engage the cable.

FIG. 11 shows a top view of the inner member including markings 3' provided on the upper side of circumferential collar 9a which indicate the corresponding clamping position.

FIG. 12 shows a bottom view of the inner member including the four quarter cups separated from each other by radial slots 4a defining a clamping lobe 7a therebetween.

FIGS. 13 and 14 show a side view and a view rotated 90°, respectively, of an outer member 29 having a square inner opening corresponding to the outer shape of the outer members having an oval clearance as shown in FIGS. 5 and 6.

FIG. 15 shows a top view of the FIG. 13 member 29 having a square opening 19 with triangular corners 20 within which the rectangular clamping lobes 7 of the inner member are disposed in non-operating position. In two of the walls of the opening 19, grooves 21 have been provided which receive the two clamping lobes 7 thus causing the inner member to stop while twisting the same within the outer member. In other words, when the tip of the lobe 7 enters the conforming grooves 21, rotation of the inner member will be prevented. Circumferential collar 29 is provided with holding grooves 140 which cooperate with cams 3 of the inner member in addition to the arresting means as described above will also stop the rotary motion of the inner member within the outer member.

Figure 15A:
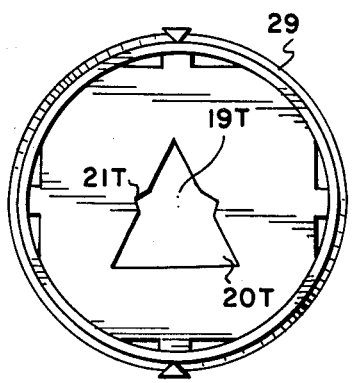
FIG. 15a is a top view of the FIG. 13 outer member showing a triangular recess.

FIG. 15a is similar to the showing of FIG. 15 differing in that the opening is of triangular configuration 19T formed by the walls 20$_T$ having grooves 21$_T$ therein. In this embodiment, three clamping jaws are provided on the inner member.

FIG. 16 shows a bottom view of the outer member of FIG. 14 which differs from the FIG. 8 description only in the provision of a square opening.

The cable grommet of FIGS. 9–16 differs from that shown in FIGS. 1 through 8 which utilize an elliptical clearance in the outer portion wherein maximum clamping of the cable is obtained after twisting the same 90°, by utilizing a square clearance which makes maximum clamping possible after twisting the cable 45°.

FIGS. 17 and 18 show in cross section an assembled grommet with the oval opening receiving the cable C shown in dotted outline therein with circumferentially disposed teeth 22 positioned against the upper edges of the clamping cams, of the inner member within the outer member disposed within a passage opening of a housing wall 23 shown in cross section. A circumferential rib or flange 3r is disposed about the inner body member 3a and adapted to engage the top rim 29r of circumferential collar 29 to act as a stop means limiting the axial movement of the inner member relative to the outer member.

FIG. 19 shows a cross section of a grommet disposed within a cup shaped housing 24a having screw threads 24s disposed about its outer surface for threadingly engaging the opening in wall 23 including a compressible seal 24 disposed between the end wall of housing 24a and a washer 24w contacting the ends of the outer member.

FIG. 20 shows a complete grommet in axial cross section with the inner member thereof secured within the outer member by holding lugs 8.

FIG. 21 shows the grommet of FIG. 20 rotated 90° depicting the cable locking position.

FIG. 22 shows a grommet shaped as a screw device wherein the blocking wings 12a, 13a are provided with exterior threads 13s secured within the housing opening 23 by screw cap 25 having threads 25s matingly engaging threads 13s. Screw cap 25 includes a protection tube 26, protecting the cable against undue bending and which may be made as an integral sealing tube, as indicated at 27.

FIG. 23 shows a perspective view of screw cap 25.

I claim:

1. A two-part strain relief cable grommet for securing cables in an opening in a carrier member including a tubular outer body member and a tubular inner member coaxially telescopically engagable and rotatable one within the other, said outer body member being insertable in said opening, said outer body member having less axial extent than said inner body member and having an inner wall surface defining an inner opening having a plurality of spaced corners, said inner body member including a generally tubular portion divided by axial slits extending over part of its length forming a plurality of segmental jaws terminating in free ends, a gradually circumferentially increasing projection disposed on respective surfaces of two oppositely facing jaws at a location spaced inwardly from their free ends engagable against the inner wall surface of said outer body member, so that upon relative rotation of said members, said two jaws move inwardly towards one another to engage a cable guided through said inner member and with at least one other jaw having a holding lug projecting outwardly from its free end thereof and engagable with an end portion of said outer body member to hold said body members together.

2. The cable grommet according to claim 1 wherein said outer member is provided with a triangular shaped inner opening and the inner member is subdivided into three clamping jaws having projections arranged thereon.

3. The cable grommet according to claim 2 wherein said projections provided on said clamping jaws correspond in shape to an equilateral triangle.

4. The cable grommet according to claim 1 wherein the outer shape of said projections are adapted to cooperate with the corresponding corners of said inner opening of said outer member.

5. The cable grommet according to claim 1 wherein said outwardly extending projections on said two jaws are arranged at different axial locations than the holding lug on said at least one other clamping jaw.

6. The cable grommet according to claim 5 wherein said projections of said two diametrically opposed clamping jaws are staggered in axial direction relative to said holding lug.

7. The cable grommet according to claim 1 wherein said outer member is provided with opposing recesses in the inner wall surface for receiving said clamping lobes in a snap in fashion upon rotating the inner member.

8. The cable grommet according to claim 1 wherein the inner opening in said outer member extends only over a portion of the axial length of said outer member.

9. The cable grommet according to claim 8, wherein said inner opening in said outer member is arranged medially of said axial length.

10. The cable grommet according to claim 8 wherein said outer member is provided with an outwardly extending rim of a length wherein said inner opening is at least partly arranged therebelow.

11. The cable grommet according to claim 10 wherein stop means are provided between the inner and outer members for arresting the reciprocal position of one member relative to the other.

12. The cable grommet of claim 11 wherein the stop means comprises a rim provided on said inner member adapted to engage said outwardly extending rim.

13. The cable grommet according to claim 12 wherein said outer member is provided with outer threads remote from said rim for engaging threaded means.

14. The cable grommet according to claim 13 wherein said outer member is provided over a portion of its length with two opposing recesses arranged in paraxial direction and a pair of substantially parallel blocking wings are provided adjacent thereto with the wings extending beyond the outer periphery of said outer member.

15. The cable grommet according to claim 14 wherein said outer member is integrally formed about the opening in the carrier member for receiving the cable.

16. The cable grommet according to claim 15 wherein said outer member is made of plastic.

* * * * *